(12) United States Patent
Nawate et al.

(10) Patent No.: US 10,266,650 B2
(45) Date of Patent: Apr. 23, 2019

(54) POLYMER, RESIN COMPOSITION AND RESIN MOLDED PRODUCT

(71) Applicant: JSR CORPORATION, Tokyo (JP)

(72) Inventors: Yuuya Nawate, Tokyo (JP); Yuki Kitamura, Tokyo (JP); Ryoji Tatara, Tokyo (JP); Teruhiko Umehara, Tokyo (JP); Nobuyuki Miyaki, Tokyo (JP); Toshiaki Kadota, Tokyo (JP)

(73) Assignee: JSR CORPORATION, Tokyo (JP)

( * ) Notice: Subject to any disclaimer, the term of this patent is extended or adjusted under 35 U.S.C. 154(b) by 0 days.

(21) Appl. No.: 15/698,786

(22) Filed: Sep. 8, 2017

(65) Prior Publication Data

US 2017/0369649 A1 Dec. 28, 2017
US 2018/0179335 A9 Jun. 28, 2018

Related U.S. Application Data

(63) Continuation of application No. PCT/JP2016/053721, filed on Feb. 8, 2016.

(30) Foreign Application Priority Data

Mar. 11, 2015 (JP) .................. 2015-048511
Oct. 21, 2015 (JP) .................. 2015-207564

(51) Int. Cl.
*C08L 71/00* (2006.01)
*C08G 65/40* (2006.01)
(Continued)

(52) U.S. Cl.
CPC .............. *C08G 65/40* (2013.01); *C08L 71/00* (2013.01); *C08L 71/10* (2013.01); *C08L 73/00* (2013.01)

(58) Field of Classification Search
CPC ......... C08G 65/40; C08L 71/00; C08L 71/10; C08L 73/00
See application file for complete search history.

(56) References Cited

U.S. PATENT DOCUMENTS

2004/0068082 A1 4/2004 Lim et al.
2005/0119420 A1 6/2005 Lim et al.
(Continued)

FOREIGN PATENT DOCUMENTS

JP H08-269214 A 10/1996
JP 2003-313491 A 11/2003

OTHER PUBLICATIONS

International Search Report dated Mar. 22, 2016, in PCT/JP2016/053721 filed Feb. 8, 2016 (w/ English translation).
(Continued)

*Primary Examiner* — Hannah J Pak
(74) *Attorney, Agent, or Firm* — Oblon, McClelland, Maier & Neustadt, L.L.P.

(57) ABSTRACT

A polymer includes a first structural unit represented by formula (1-1), (1-2) or (1-3) and a second structural unit represented by formula (2) or (3). In the formulae (1-1) to (1-3), (2) and (3), $R^1$, $R^{10}$ and $R^{11}$ each represent a halogen atom, a monovalent hydrocarbon group having 1 to 20 carbon atoms, a monovalent halogenated hydrocarbon group having 1 to 20 carbon atoms, a nitro group or a cyano group; Zs each represent —O— or —S—; $R^4$s each represent a methylene group or an alkylene group having 2 to 4 carbon atoms; and L represents a divalent group represented by formula (2-1). In the formula (2-1), $R^a$ represents a divalent alicyclic hydrocarbon group having 5 to 30 ring atoms or a divalent fluorinated alicyclic hydrocarbon group having 5 to 30 ring atoms.

(1-1)

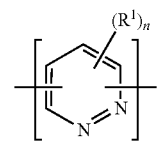

(1-2)

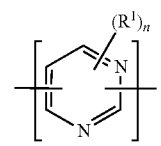

(1-3)

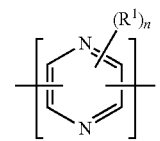

(2)

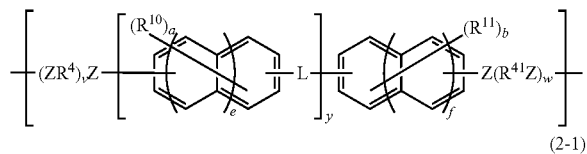

(2-1)

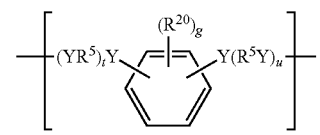

(3)

$$\left[ \!\!-\!\!(YR^5)_t Y \!\!-\!\!\!\!\!\!\!\!\!\overset{(R^{20})_g}{\bigcirc}\!\!\!\!\!\!\!\!\!\!-\!\! Y(R^5Y)_u \!\!-\!\! \right]$$

7 Claims, 1 Drawing Sheet

(51) Int. Cl.
*C08L 73/00* (2006.01)
*C08L 71/10* (2006.01)

(56) References Cited

U.S. PATENT DOCUMENTS

| | | |
|---|---|---|
| 2005/0124767 A1 | 6/2005 | Lim et al. |
| 2005/0159576 A1 | 7/2005 | Lim et al. |
| 2014/0272722 A1 | 9/2014 | Nakafuji et al. |
| 2018/0009938 A1* | 1/2018 | Anabuki .............. C08G 63/199 |

OTHER PUBLICATIONS

Extended European Search Report dated Jul. 26, 2018 in Patent Application No. 16761419.7, 5 pages.
Office Action dated Jan. 29, 2019, in Chinese Patent Application No. 201680010525.0 (w/ Computer-generated English translation).

* cited by examiner

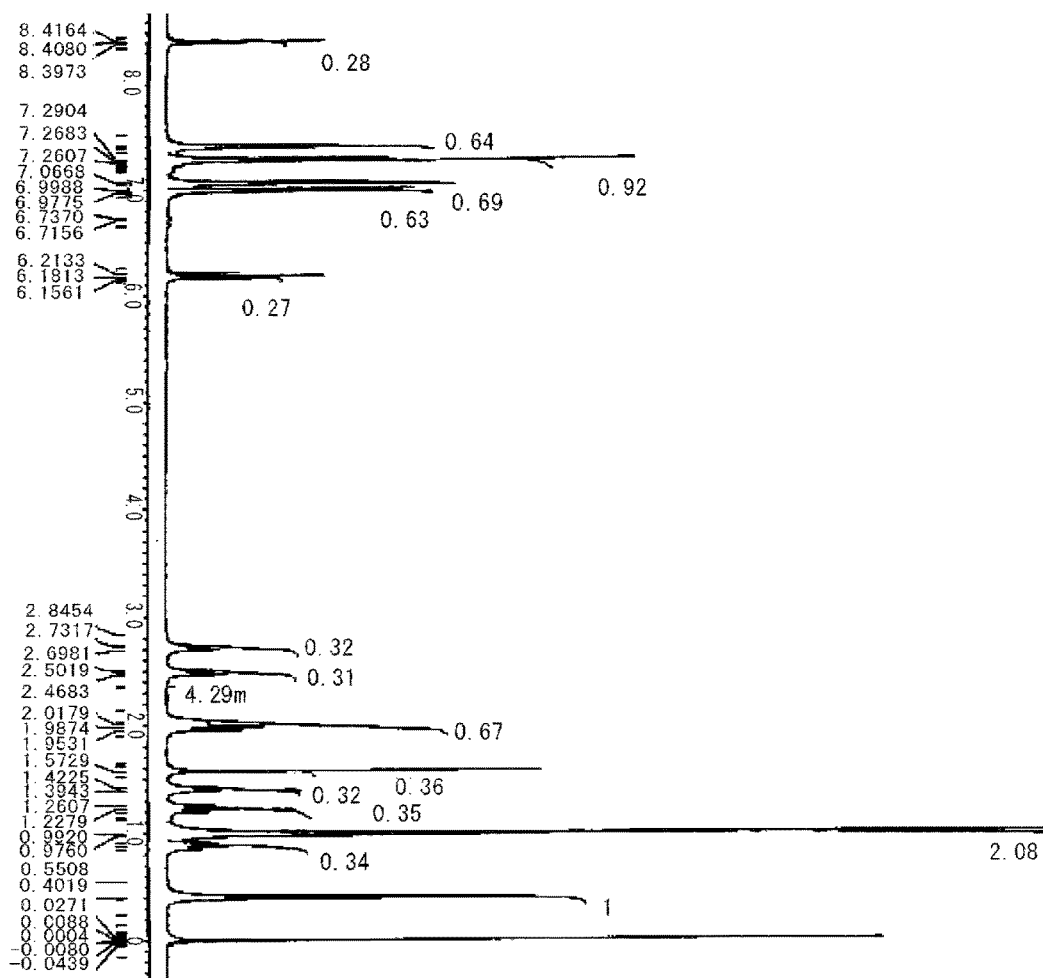

POLYMER, RESIN COMPOSITION AND RESIN MOLDED PRODUCT

CROSS-REFERENCE TO RELATED APPLICATIONS

The present application is a continuation application of International Application No. PCT/JP2016/053721, filed Feb. 8, 2016, which claims priority to Japanese Patent Application No. 2015-048511, filed Mar. 11, 2015 and to Japanese Patent Application No. 2015-207564, filed Oct. 21, 2015. The contents of these applications are incorporated herein by reference in their entirety.

BACKGROUND OF THE INVENTION

Field of the Invention

The present invention relates to a polymer, a resin composition and a resin molded product.

Discussion of the Background

A polymer obtained by copolymerizing a dihydric phenol monomer and an aromatic dicarboxylic acid monomer has high heat resistance and is highly transparent, thus being widely used in the fields related to electricity, automobiles, machineries, and the like. In these fields, the polymer is generally dissolved in a solvent to prepare a resin composition, and then a resin molded product such as a film is formed from the resin composition to find various uses.

For example, Japanese Unexamined Patent Application, Publication No. H8-269214 discloses a film formed from a resin composition prepared by dissolving, in methylene chloride, a polyarylate obtained by copolymerizing bisphenol A, which is a dihydric phenol monomer, with terephthalic acid and isophthalic acid, which are aromatic dicarboxylic acid monomers.

In recent years, meanwhile, the use of halogen organic solvents such as methylene chloride have been avoided because of concerns about adverse effects on the environment and human health, and thus replacing them with halogen-free organic solvents have been desired.

In a case where the resin molded product is to be used at high temperatures, the polymer needs to be resistant to heat so as to inhibit the heat deterioration of the resin molded product.

As a polymer with increased solubility in a halogen-free organic solvent, a polymer having an improved structure of the dihydric phenol monomer has been studied. For example, Japanese Unexamined Patent Application, Publication No. 2003-313491 suggests that a polyarylate prepared by using, as a dihydric phenol monomer, a sulfur atom-containing monomer such as bis(4-hydroxyphenyl) sulfone has increased solubility in a halogen-free organic solvent.

SUMMARY OF THE INVENTION

According to one aspect of the present invention, a polymer includes a first structural unit represented by formula (1-1), (1-2) or (1-3), and a second structural unit represented by formula (2) or (3).

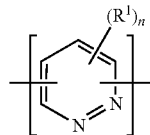
(1-1)

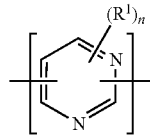
(1-2)

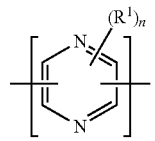
(1-3)

In the formulae (1-1) to (1-3), $R^1$ each independently represents a halogen atom, a monovalent hydrocarbon group having 1 to 20 carbon atoms, a monovalent halogenated hydrocarbon group having 1 to 20 carbon atoms, a nitro group or a cyano group; and n is each independently an integer of 0 to 2, wherein, in a case where n is 2, a plurality of $R^1$s are identical or different, wherein the plurality of $R^1$s optionally taken together represent a ring structure through binding.

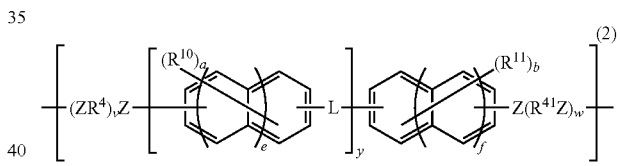
(2)

In the formula (2), $R^{10}$ and $R^{11}$ each independently represent a halogen atom, a monovalent hydrocarbon group having 1 to 20 carbon atoms, a monovalent halogenated hydrocarbon group having 1 to 20 carbon atoms, a nitro group or a cyano group; e and f are each independently an integer of 0 to 2; a and b are each independently an integer of 0 to 8, wherein, in a case where a is no less than 2, a plurality of $R^{10}$s are identical or different, wherein the plurality of $R^{10}$s optionally taken together represent a ring structure through binding, and in a case where b is no less than 2, a plurality of $R^{11}$s are identical or different, wherein the plurality of $R^{11}$s optionally taken together represent a ring structure through binding; Zs each independently represent —O— or —S—; $R^4$s each independently represent a methylene group or an alkylene group having 2 to 4 carbon atoms; v is an integer of 0 to 2, wherein, in a case where v is 2, two $R^4$s are identical or different, and two Zs are identical or different; w is an integer of 0 to 2, wherein, in a case where w is 2, two $R^4$s are identical or different, and two Zs are identical or different; L represents a divalent group represented by formula (2-1); and y is an integer of 1 to 3, wherein, in a case where y is no less than 2, a plurality of Ls are identical or different, and in a case where y is no less than 2 and a is no less than 1, a plurality of $R^{10}$s are identical or different.

(2-1)

In the formula (2-1), $R^a$ represents a divalent alicyclic hydrocarbon group having 5 to 30 ring atoms or a divalent fluorinated alicyclic hydrocarbon group having 5 to 30 ring atoms, and

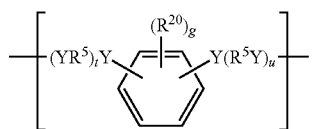
(3)

In the formula (3), $R^{20}$ represents a monovalent hydrocarbon group having 1 to 20 carbon atoms or a monovalent halogenated hydrocarbon group having 1 to 20 carbon atoms; g is an integer of 1 to 4, wherein, in a case where g is no less than 2, a plurality of $R^{20}$s are identical or different, wherein the plurality of $R^{20}$s optionally taken together represent a ring structure through binding; Ys each independently represent —O— or —S—; $R^5$s each independently represent a methylene group or an alkylene group having 2 to 4 carbon atoms; t is an integer of 0 to 2, wherein, in a case where t is 2, two $R^5$s are identical or different, and two Ys are identical or different; and u is an integer of 0 to 2, wherein, in a case where u is 2, two $R^5$s are identical or different, and two Ys are identical or different.

According to another aspect of the present invention, a resin composition includes the polymer and an organic solvent.

According to further aspect of the present invention, a resin molded product includes the polymer.

BRIEF DESCRIPTION OF THE DRAWINGS

FIGURE shows a $^1$H-NMR spectrum of a polymer of Example 1.

DESCRIPTION OF EMBODIMENTS

According to an embodiment of the invention made for solving the aforementioned problems, a polymer has a first structural unit represented by the following formula (1-1), (1-2) or (1-3) and a second structural unit represented by the following formula (2) or (3).

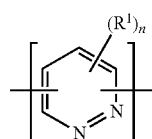
(1-1)

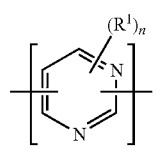
(1-2)

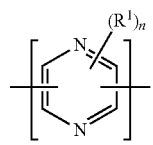
(1-3)

In the formulae (1-1) to (1-3), $R^1$ each independently represents a halogen atom, a monovalent hydrocarbon group having 1 to 20 carbon atoms, a monovalent halogenated hydrocarbon group having 1 to 20 carbon atoms, a nitro group or a cyano group; and n is each independently an integer of 0 to 2, wherein, in a case where n is 2, a plurality of $R^1$s may be identical or different, wherein the plurality of $R^1$s optionally taken together may represent the ring structure through binding.

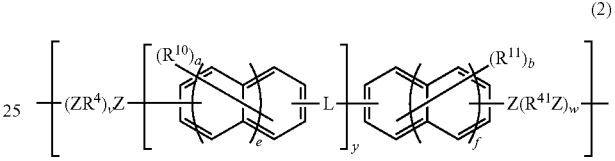
(2)

In the formula (2), $R^{10}$ and $R^{11}$ each independently represent a halogen atom, a monovalent hydrocarbon group having 1 to 20 carbon atoms, a monovalent halogenated hydrocarbon group having 1 to 20 carbon atoms, a nitro group or a cyano group; e and f are each independently an integer of 0 to 2; a and b are each independently an integer of 0 to 8, wherein, in a case where a is no less than 2, a plurality of $R^{10}$s may be identical or different, wherein the plurality of $R^{10}$s optionally taken together may represent the ring structure through binding, and in a case where b is no less than 2, a plurality of $R^{11}$s may be identical or different, wherein the plurality of $R^{11}$s optionally taken together may represent the ring structure through binding; Zs each independently represent —O— or —S—; $R^4$s each independently represent a methylene group or an alkylene group having 2 to 4 carbon atoms; v is an integer of 0 to 2, wherein, in a case where v is 2, two $R^4$s may be identical or different, and two Zs may be identical or different; w is an integer of 0 to 2, wherein, in a case where w is 2, two $R^4$s may be identical or different, and two Zs may be identical or different; L represents a divalent group represented by the following formula (2-1); and y is an integer of 1 to 3, wherein, in a case where y is no less than 2, a plurality of Ls may be identical or different, and in a case where y is no less than 2 and a is no less than 1, a plurality of $R^{10}$s may be identical or different.

(2-1)

In the formula (2-1), $R^a$ represents a divalent alicyclic hydrocarbon group having 5 to 30 ring atoms or a divalent fluorinated alicyclic hydrocarbon group having 5 to 30 ring atoms.

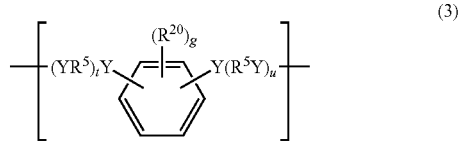

(3)

In the formula (3), $R^{20}$ represents a monovalent hydrocarbon group having 1 to 20 carbon atoms or a monovalent halogenated hydrocarbon group having 1 to 20 carbon atoms; g is an integer of 1 to 4, wherein, in a case where g is no less than 2, a plurality of $R^{20}$s may be identical or different, wherein the plurality of $R^{20}$s optionally taken together may represent the ring structure through binding; Ys each independently represent —O— or —S—; $R^5$s each independently represent a methylene group or an alkylene group having 2 to 4 carbon atoms; t is an integer of 0 to 2, wherein, in a case where t is 2, two $R^5$s may be identical or different, and two Ys may be identical or different; and u is an integer of 0 to 2, wherein, in a case where u is 2, two $R^5$s may be identical or different, and two Ys may be identical or different.

Further embodiments of the present invention involve a resin composition containing the polymer and an organic solvent, and a resin molded product containing the polymer.

As referred to herein, the "hydrocarbon group" may involve a chain hydrocarbon group and a cyclic hydrocarbon group. The "hydrocarbon group" may be either a saturated hydrocarbon group or an unsaturated hydrocarbon group. The "chain hydrocarbon group" as referred to means a hydrocarbon group not including a ring structure but constructed with only a chain structure. The "chain hydrocarbon group" may involve both a straight chain hydrocarbon group and a branched hydrocarbon group. The "cyclic hydrocarbon group" as referred to means a hydrocarbon group constructed with a ring structure and may involve both an alicyclic hydrocarbon group and an aromatic hydrocarbon group. The "alicyclic hydrocarbon group" as referred to means a hydrocarbon group which includes not an aromatic ring structure but only an alicyclic structure as the ring structure, and may involve both a monocyclic alicyclic hydrocarbon group and a polycyclic alicyclic hydrocarbon group. However, it is not necessary to be constructed with only an alicyclic structure, and a chain structure may be included as a part thereof. The "aromatic hydrocarbon group" as referred to means a hydrocarbon group which includes an aromatic ring structure as the ring structure, and may involve both a monocyclic aromatic hydrocarbon group and a polycyclic aromatic hydrocarbon group. However, it is not necessary to be constructed with only an aromatic ring structure, and a chain structure and/or an alicyclic structure may be included as a part thereof. The term "number of ring atoms" as referred to means the number of atoms constituting a ring structure. In a case where the ring structure is polycyclic, it means the number of atoms constituting the polycyclic structure.

The embodiment of the present invention is capable of providing a polymer having superior heat resistance and increased solubility in various types of organic solvents, and a resin composition and a resin molded product containing the polymer.

The following will describe in detail, a polymer, a resin composition and a resin molded product according to the embodiment of the present invention.

Polymer

The polymer according to an embodiment of the present invention (hereinafter, may be also referred to as "(A) polymer" or "polymer (A)") has the first structural unit and the second structural unit. The polymer (A) may have two or more types of each of the above structural units. It is to be noted that, as long as the polymer (A) has the first and second structural units, the arrangement of each structural unit and other structures of the polymer (A) are not particularly limited. For example, the polymer (A) may have any structural unit(s) other than the first and second structural units. In addition, the polymer (A) may have repeating units (a) to (f) that include the first and second structural units as will be described below, and may further have other repeating unit(s).

The polymer (A) has, by virtue of the first and second structural units, superior heat resistance and increased solubility in various types of organic solvents. Although not necessarily clarified, and without wishing to be bound by any theory, the reason for achieving the effects described above due to the polymer (A) having the aforementioned constitutions is mainly inferred as in the following (1) and (2).

(1) The incorporation of the first structural unit which has a specific heterocyclic structure including two nitrogen atoms enables an appropriate adjustment of polarization of polymer chains, while the incorporation of the second structural unit which has a structure in which aromatic rings bind to each other through a relatively bulky ring structure or a structure including a benzene ring with substituents bonded thereto enables inhibition of aggregation of polymer chains. Consequently, an increase in the solubility in various types of organic solvents is enabled.

(2) The incorporation of the second structural unit which has a structure in which aromatic rings bind to each other through a relatively bulky ring structure or a structure including a benzene ring with substituents bonded thereto enables an appropriate adjustment of the rigidity of polymer chains. The polymer (A) accordingly has superior heat resistance.

The following will describe the first and second structural units and other structural units which may be optionally contained in the polymer (A).

First Structural Unit

The first structural unit is represented by the following formula (1-1), (1-2) or (1-3).

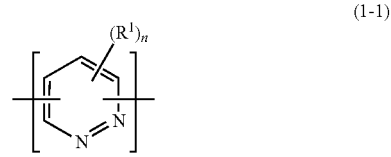

(1-1)

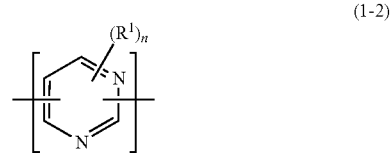

(1-2)

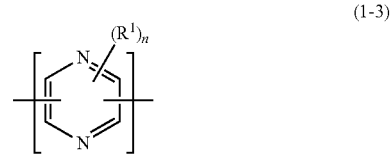

(1-3)

In the above formulae (1-1) to (1-3), $R^1$ each independently represents a halogen atom, a monovalent hydrocarbon group having 1 to 20 carbon atoms, a monovalent halogenated hydrocarbon group having 1 to 20 carbon atoms, a nitro group or a cyano group; and n is each independently an integer of 0 to 2, wherein, in a case where n is 2, a plurality of $R^1$s may be identical or different, wherein the plurality of $R^1$s optionally taken together may represent the ring structure through binding.

The halogen atom which may be represented by $R^1$ is exemplified by a fluorine atom, a chlorine atom, a bromine atom, an iodine atom, and the like.

The monovalent hydrocarbon group having 1 to 20 carbon atoms which may be represented by $R^1$ is exemplified by a monovalent chain hydrocarbon group, a monovalent alicyclic hydrocarbon group, a monovalent aromatic hydrocarbon group, and the like.

Examples of the monovalent chain hydrocarbon group include:

alkyl groups such as a methyl group, an ethyl group, an n-propyl group, an i-propyl group, an n-butyl group, an i-butyl group, a sec-butyl group, a t-butyl group and an n-pentyl group;

alkenyl groups such as an ethenyl group, a propenyl group, a butenyl group and a pentenyl group;

alkynyl groups such as an ethynyl group, a propynyl group, a butynyl group and a pentenyl group; and the like.

Examples of the monovalent alicyclic hydrocarbon group include:

monocyclic cycloalkyl groups such as a cyclopropyl group, a cyclobutyl group, a cyclopentyl group and a cyclohexenyl group;

polycyclic cycloalkyl groups such as a norbornyl group and an adamantyl group;

monocyclic cycloalkenyl groups such as a cyclopropenyl group, a cyclobutenyl group, a cyclopentenyl group and a cyclohexyl group;

polycyclic cycloalkenyl groups such as a norbornenyl group; and the like.

Examples of the monovalent aromatic hydrocarbon group include:

aryl groups such as a phenyl group, a tolyl group, a xylyl group, a naphthyl group and an anthryl group;

aralkyl groups such as a benzyl group, a phenethyl group, a phenylpropyl group and a naphthylmethyl group; and the like.

The monovalent halogenated hydrocarbon group having 1 to 20 carbon atoms which may be represented by $R^1$ is exemplified by a group obtained by substituting a part or all of hydrogen atoms included in the monovalent hydrocarbon group having 1 to 20 carbon atoms which is exemplified as the group represented by $R^1$ with halogen atoms such as a fluorine atom, a chlorine atom, a bromine atom, an iodine atom, and the like.

$R^1$ represents, in light of an improvement of the polymerization reactivity of the monomer for providing the first structural unit, preferably a halogen atom, a monovalent hydrocarbon group having 1 to 3 carbon atoms, a monovalent halogenated hydrocarbon group having 1 to 3 carbon atoms, a nitro group or a cyano group, and more preferably a fluorine atom, a chlorine atom, a methyl group, a nitro group or a cyano group. From the same perspective, n is preferably 0 or 1, and more preferably 0.

In light of the improvement of the polymerization reactivity of the monomer for providing the first structural unit, a position of one atomic bonding with respect to another atomic bonding in the first structural unit is preferably the meta position or the para position, and more preferably the meta position.

In addition, the first structural unit is preferably a structural unit which is represented by the above formula (1-2) having a pyrimidine skeleton, in light of the improvement of the polymerization reactivity of the monomer for providing the first structural unit and the improvement of the solubility in various types of organic solvents.

The lower limit of the proportion of the first structural unit contained in the polymer (A) with respect to the total structural units contained in the polymer (A) is preferably 5 mol %, more preferably 10 mol %, still more preferably 20 mol %, and particularly preferably 30 mol %. The upper limit of the proportion is preferably 67 mol %, more preferably 60 mol %, still more preferably 55 mol %, and particularly preferably 50 mol %. When the proportion falls within the above range, a further improvement of the solubility in various types of organic solvents is enabled.

Second Structural Unit

The second structural unit is represented by the following formula (2) or (3).

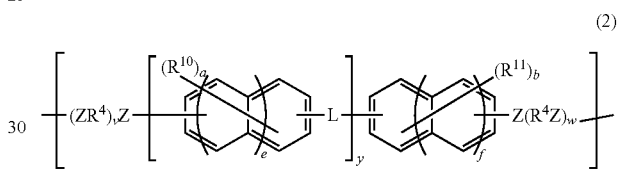

(2)

In the above formula (2), $R^{10}$ and $R^{11}$ each independently represent a halogen atom, a monovalent hydrocarbon group having 1 to 20 carbon atoms, a monovalent halogenated hydrocarbon group having 1 to 20 carbon atoms, a nitro group or a cyano group; e and f are each independently an integer of 0 to 2; a and b are each independently an integer of 0 to 8, wherein, in a case where a is no less than 2, a plurality of $R^{10}$s may be identical or different, wherein the plurality of $R^{10}$s optionally taken together may represent the ring structure through binding, and in a case where b is no less than 2, a plurality of $R^{11}$s may be identical or different, wherein the plurality of $R^{11}$s optionally taken together may represent the ring structure through binding; Zs each independently represent —O— or —S—; $R^4$s each independently represent a methylene group or an alkylene group having 2 to 4 carbon atoms; v is an integer of 0 to 2, wherein, in a case where v is 2, two $R^4$s may be identical or different, and two Zs may be identical or different; w is an integer of 0 to 2, wherein, in a case where w is 2, two $R^4$s may be identical or different, and two Zs may be identical or different; L represents a divalent group represented by the following formula (2-1); and y is an integer of 1 to 3, wherein, in a case where y is no less than 2, a plurality of Ls may be identical or different, and in a case where y is no less than 2 and a is no less than 1, a plurality of $R^{10}$s may be identical or different.

(2-1)

In the above formula (2-1), $R^a$ represents a divalent alicyclic hydrocarbon group having 5 to 30 ring atoms or a divalent fluorinated alicyclic hydrocarbon group having 5 to 30 ring atoms.

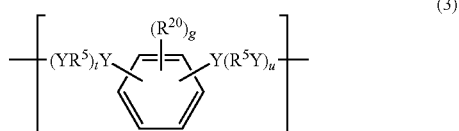

(3)

In the above formula (3), $R^{20}$ represents a monovalent hydrocarbon group having 1 to 20 carbon atoms or a monovalent halogenated hydrocarbon group having 1 to 20 carbon atoms; g is an integer of 1 to 4, wherein, in a case where g is no less than 2, a plurality of $R^{20}$s may be identical or different, wherein the plurality of $R^{20}$s optionally taken together may represent the ring structure through binding; Ys each independently represent —O— or —S—; $R^5$s each independently represent a methylene group or an alkylene group having 2 to 4 carbon atoms; t is an integer of 0 to 2, wherein, in a case where t is 2, two $R^5$s may be identical or different, and two Ys may be identical or different; and u is an integer of 0 to 2, wherein, in a case where u is 2, two $R^5$s may be identical or different, and two Ys may be identical or different.

The halogen atoms which may be represented by $R^{10}$ and $R^{11}$ are exemplified by halogen atoms similar to those exemplified as the halogen atom which may be represented by $R^1$.

The monovalent hydrocarbon groups each having 1 to 20 carbon atoms which may be represented by $R^{10}$, $R^{11}$ and $R^{20}$ are exemplified by a monovalent hydrocarbon group having 1 to 20 carbon atoms which is exemplified as the group represented by $R^1$.

The monovalent halogenated hydrocarbon groups each having 1 to 20 carbon atoms which may be represented by $R^{10}$, $R^{11}$ and $R^{20}$ are exemplified by groups obtained by substituting a part or all of hydrogen atoms included in the monovalent hydrocarbon group having 1 to 20 carbon atoms which is exemplified as the group represented by $R^1$ with halogen atoms such as a fluorine atom, a chlorine atom, a bromine atom, an iodine atom, and the like.

In light of the improvement of the polymerization reactivity of the monomer for providing the second structural unit, $R^{10}$ and $R^{11}$ each represent: preferably a halogen atom, a monovalent hydrocarbon group having 1 to 6 carbon atoms, a monovalent halogenated hydrocarbon group having 1 to 6 carbon atoms, a nitro group and a cyano group; more preferably a fluorine atom, a chlorine atom, a methyl group, a t-butyl group, a phenyl group, a nitro group and a cyano group; still more preferably a fluorine atom, a methyl group, a t-butyl group and a phenyl group; and particularly preferably a methyl group.

In light of the improvement of the polymerization reactivity of the monomer for providing the second structural unit and the bulkiness, $R^{20}$ represents: preferably a monovalent hydrocarbon group having 3 to 20 carbon atoms and a monovalent halogenated hydrocarbon having 3 to 20 carbon atoms; more preferably an alkyl group having 3 to 10 carbon atoms and an aryl group having 6 to 10 carbon atoms; still more preferably a t-alkyl group, a phenyl group and a naphthyl group; and particularly preferably a t-butyl group.

In light of the improvement of the polymerization reactivity of the monomer for providing the second structural unit, a and b are each preferably 0 to 2, more preferably 0 and 1, and still more preferably 0. From the same perspective, e and f are each preferably 0 and 1, and more preferably 0. In light of the improvement of the polymerization reactivity of the monomer for providing the second structural unit and the bulkiness, g is preferably 1 to 3, and more preferably 1 or 2.

Z and Y each preferably represent —O— in light of the structural stability of the polymer (A).

The alkylene groups each having 2 to 4 carbon atoms which may be represented by $R^4$ and $R^5$ are exemplified by an ethylene group, an n-propylene group, an isopropylene group, an n-butylene group, a sec-butylene group and t-butylene group.

$R^4$ and $R^5$ each represent, in light of the improvement of the polymerization reactivity of the monomer for providing the second structural unit, preferably a methylene group and an ethylene group.

In light of the improvement of the polymerization reactivity of the monomer for providing the second structural unit, v and w are each preferably 0 and 1, and more preferably 0. From the same perspective, t and u are each preferably 0 and 1, and more preferably 0.

The divalent alicyclic hydrocarbon group having 5 to 30 ring atoms which may be represented by $R^a$ is exemplified by a monocyclic alicyclic hydrocarbon group having 5 to 15 ring atoms, a monocyclic fluorinated alicyclic hydrocarbon group having 5 to 15 ring atoms, a polycyclic alicyclic hydrocarbon group having 7 to 30 ring atoms, and a polycyclic fluorinated alicyclic hydrocarbon group having 7 to 30 ring atoms.

Examples of the monocyclic alicyclic hydrocarbon group having 5 to 15 ring atoms include a cyclopentane-1,1-diyl group, a cyclohexane-1,1-diyl group, a cyclopentane-3,3-diyl group, a cyclohexane-3,3-diyl group, a cyclooctane-1,1-diyl group, a cyclodecane-1,1-diyl group, a cyclododecane-1,1-diyl group, a group obtained by substituting a part or all of hydrogen atoms included in the above groups with monovalent chain hydrocarbon groups each having 1 to 20 carbon atoms, and the like.

The monocyclic alicyclic hydrocarbon group having 5 to 15 ring atoms is preferably an alicyclic hydrocarbon group having 5 to 10 ring atoms, in light of further improving the solubility in various types of organic solvents while maintaining high heat resistance.

Examples of the monocyclic fluorinated alicyclic hydrocarbon group having 5 to 15 ring atoms include groups obtained by substituting with fluorine atoms a part or all of hydrogen atoms included in the group exemplified as the monocyclic alicyclic hydrocarbon group having 5 to 15 ring atoms, and the like.

The monocyclic fluorinated alicyclic hydrocarbon group having 5 to 15 ring atoms is preferably a fluorinated alicyclic hydrocarbon group having 5 to 10 ring atoms in light of further improving the solubility in various types of organic solvents while maintaining high heat resistance.

Examples of the polycyclic alicyclic hydrocarbon group having 7 to 30 ring atoms include: groups obtained by removing two hydrogen atoms bonded to one carbon atom included in the polycyclic alicyclic hydrocarbon group such as norbornane, norbornene, adamantane, tricyclo[$5.2.1.0^{2,6}$] decane, tricyclo[$5.2.1.0^{2,6}$]heptane, pinane, camphane, decalin, nortricyclene, perhydroanthracene, perhydroazulene, cyclopentanohydrophenanthrene, bicyclo[2.2.2]-2-octene, and the like; groups obtained by substituting a part or all of hydrogen atoms included in the above groups with monovalent chain hydrocarbon groups each having 1 to 20 carbon atoms; and the like.

Examples of the polycyclic fluorinated alicyclic hydrocarbon group having 7 to 30 ring atoms include a group obtained by substituting with fluorine atoms a part or all of hydrogen atoms included in the group exemplified as the polycyclic alicyclic hydrocarbon group having 7 to 30 ring atoms, and the like.

In light of further improving solubility in various types of organic solvents while maintaining high heat resistance, the divalent group represented by the above formula (2-1) is preferably a cyclopentane-1,1-diyl group, a cyclohexane-1,1-diyl group, and a group obtained by substituting a part or all of hydrogen atoms included in the above groups with monovalent chain hydrocarbon groups each having 1 to 3 carbon atoms, more preferably a group obtained by substituting a part or all of hydrogen atoms included in a cyclohexane-1,1-diyl group and a cyclohexane-1,1-diyl group with monovalent chain hydrocarbon groups each having 1 to 3 carbon atoms, still more preferably a group obtained by substituting with methyl groups a part or all of hydrogen atoms included in a cyclohexane-1,1-diyl group, and particularly preferably a 3,3,5-trimethylcyclohexane-1,1-diyl group.

In light of the improvement of the polymerization reactivity of the monomer for providing the second structural unit, y is preferably 1 or 2, and more preferably 1.

In light of the improvement of the polymerization reactivity of the monomer for providing the second structural unit, a position of one atomic bonding with respect to another bonding in a benzene ring of the second structural unit represented by the above formula (3) is preferably the para position or the meta position, and more preferably the para position. On the other hand, in light of the improvement of the solubility of the polymer, the ortho position is preferred.

The lower limit of the proportion of the second structural unit contained in the polymer (A) with respect to the total structural units contained the polymer (A) is preferably 5 mol %, more preferably 10 mol %, still more preferably 20 mol %, and particularly preferably 30 mol %. The upper limit of the proportion is preferably 67 mol %, more preferably 60 mol %, still more preferably 55 mol %, and particularly preferably 50 mol %. When the proportion falls within the above range, a further improvement of the solubility in various types of organic solvents is enabled while high heat resistance is maintained.

Other Structural Units

For the adjustment of molecular weight and the like, the polymer (A) may have other structural unit(s) different from the first and second structural units within a range not leading to impairment of the above effects.

The other structural units are exemplified by:

a third structural unit represented by the above formula (2), wherein L represents a single bond, —O—, —S—, —CO—, —SO—, —SO$_2$—, —CONH—, —COO—, a divalent chain hydrocarbon group having 1 to 20 carbon atoms, a divalent fluorinated chain hydrocarbon group having 1 to 20 carbon atoms, a divalent aromatic hydrocarbon group having 6 to 20 carbon atoms, or a divalent fluorinated aromatic hydrocarbon group having 6 to 20 carbon atoms;

a fourth structural unit represented by the following formula (4); and the like.

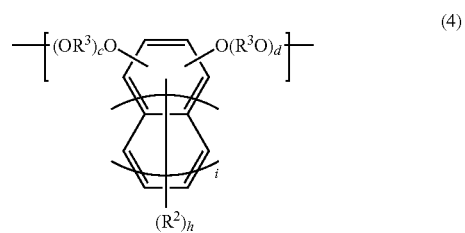

In the above formula (4), $R^2$ represents a halogen atom, a monovalent hydrocarbon group having 1 to 20 carbon atoms, a monovalent halogenated hydrocarbon group having 1 to 20 carbon atoms, a nitro group or a cyano group; i is 1 or 2; h is an integer of 0 to 8, wherein, in a case where h is no less than 2, a plurality of $R^2$s may be identical or different, wherein the plurality of $R^2$s optionally taken together may represent the ring structure through binding; $R^3$s each independently represent a methylene group or an alkylene group having 2 to 4 carbon atoms; c is an integer of 0 to 2, wherein, in a case where c is 2, two $R^3$s may be identical or different; and d is an integer of 0 to 2, wherein, in a case where d is 2, two $R^a$s may be identical or different.

The halogen atom which may be represented by $R^2$ is exemplified by halogen atoms similar to those exemplified as the halogen atom which may be represented by $R^1$.

The monovalent hydrocarbon group having 1 to 20 carbon atoms which may be represented by $R^2$ is exemplified by groups similar to those exemplified as the monovalent hydrocarbon group having 1 to 20 carbon atoms which may be represented by $R^1$.

The monovalent halogenated hydrocarbon group having 1 to 20 carbon atoms which may be represented by $R^2$ is exemplified by a group obtained by substituting a part or all of hydrogen atoms included in the monovalent hydrocarbon group having 1 to 20 carbon atoms which is exemplified as the group which may be represented by $R^1$, with halogen atoms such as a fluorine atom, a chlorine atom, a bromine atom, an iodine atom, and the like.

$R^2$ represents preferably a monovalent hydrocarbon group having 1 to 10 carbon atoms, more preferably a monovalent chain hydrocarbon group having 1 to 10 carbon atoms, still more preferably a monovalent branched hydrocarbon group having 1 to 10 carbon atoms, and particularly preferably an i-butyl group, a sec-butyl group or a t-butyl group. When $R^2$ represents any of the above-specified groups, a further improvement of the solubility in various types of organic solvents is enabled.

The alkylene group having 2 to 4 carbon atoms which may be represented by $R^3$ is exemplified by an ethylene group, an n-propylene group, an isopropylene group, an n-butylene group, a sec-butylene group and a t-butylene group.

In light of the improvement of the polymerization reactivity of the monomer for providing the fourth structural unit, $R^3$ represents preferably a methylene group or an ethylene group.

In light of the improvement of the polymerization reactivity of the monomer for providing the fourth structural unit, c and d are each preferably 0 or 1, and more preferably 0. From the same perspective, i is preferably 1.

In light of the further improvement of the solubility in various types of organic solvents and the formability, h is preferably 1 or 2, and more preferably 1.

Of the other structural units mentioned above, the fourth structural unit is preferred in light of the further improvement of the solubility in various types of organic solvents. From the same perspective, the fourth structural unit is preferably a structural unit represented by the above formula (4) in which —O(R$^3$O)$_d$— occupies the ortho position with respect to the —(OR$^3$)$_c$O—.

In the case where the polymer (A) has the other structural unit, the lower limit of the proportion of the other structural unit contained in the polymer (A) with respect to the total structural units contained the polymer (A) is preferably 1 mol %, more preferably 5 mol %, and still more preferably 10 mol %. The upper limit of the proportion is preferably 40 mol %, and more preferably 30 mol %. When the proportion falls within the above range, the adjustment of molecular weight within a range not leading to impairment of the above effects is enabled.

In the case where the polymer (A) has the fourth structural unit, the lower limit of the proportion of the fourth structural unit contained in the polymer (A) with respect to the total structural units contained in the polymer (A) is preferably 5 mol %, more preferably 10 mol %, and still more preferably 20 mol %. The upper limit of the proportion is preferably 40 mol %, and more preferably 30 mol %. When the proportion falls within the above range, a further improvement of the solubility in various types of organic solvents is enabled.

Arrangement of Each Structural Unit

Although the arrangement of each structural unit in the polymer (A) is not particularly limited as long as it has the first and second structural units, it is preferred that the polymer (A) has the first and second structural units in the main chain in light of further improving the solubility in various types of organic solvents while maintaining high heat resistance. The term "main chain" as referred to herein means in relative terms the longest linking chain in the polymer.

When the polymer (A) has the first and second structural units in the main chain, a decrease in permittivity is facilitated in the case of employing the polymer (A) for an insulating film for use in printed wiring boards, and thus, for example, an improvement of the high frequency wave properties of the printed wiring boards is enabled.

Repeating Unit

The polymer (A) having the first and second structural units in the main chain is exemplified by a polymer having, in the main chain thereof, a repeating unit (a) represented by the following formula (a), a repeating unit (b) represented by the following formula (b), a repeating unit (c) represented by the following formula (c), a repeating unit (d) represented by the following formula (d), a repeating unit (e) represented by the following formula (e), a repeating unit (f) represented by the following formula (f), any combination of these repeating units (hereinafter, may be also collectively referred to as "specific repeating units"), or the like.

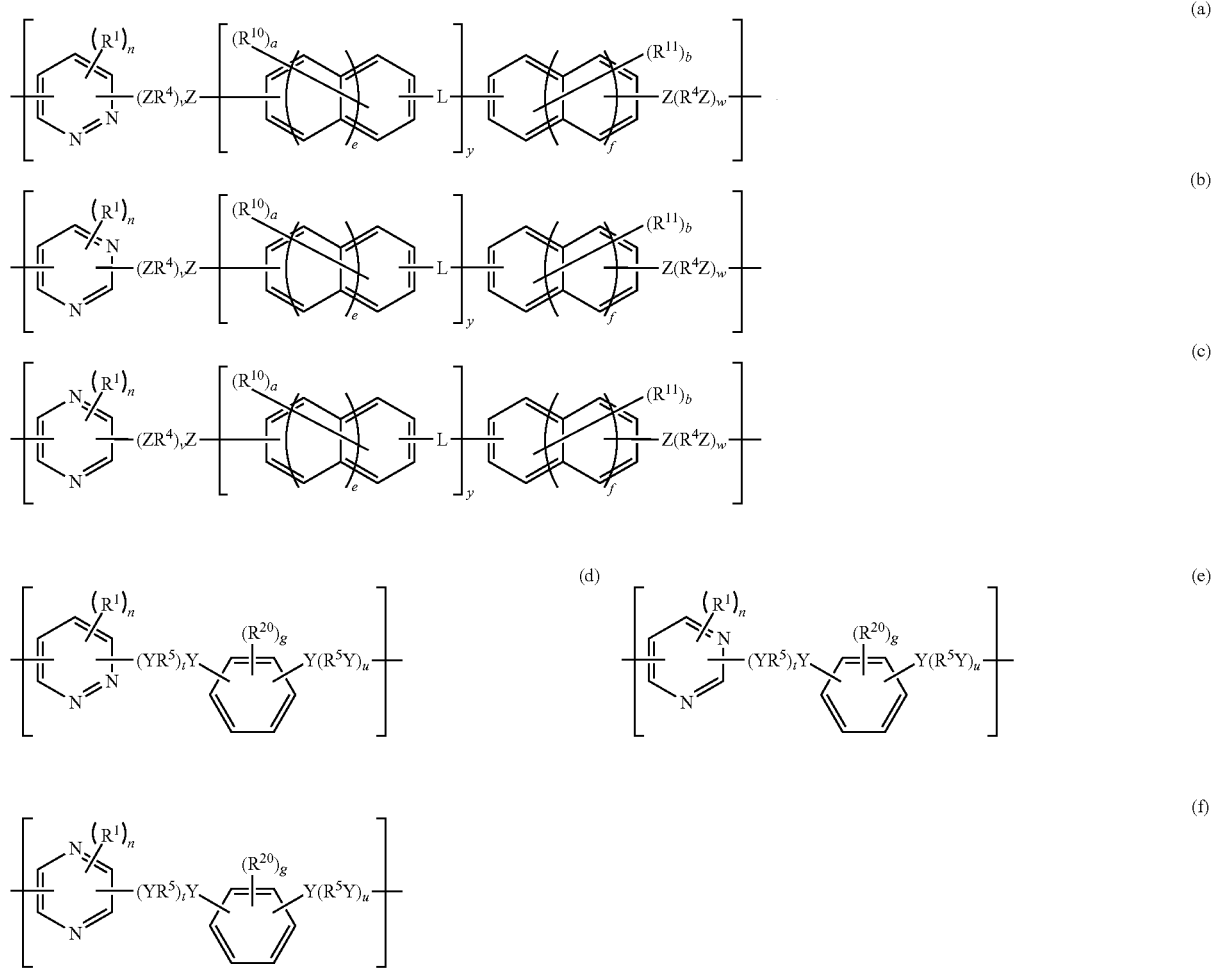

In the above formulae (a) to (f), $R^1$ and n are each as defined in the above formulae (1-1) to (1-3); $R^4$, $R^{10}$, $R^{11}$, a, b, e, f, v, w, y, L and Z are each as defined in the above formula (2); and $R^5$, $R^{20}$, g, t, u and Y are each as defined in the above formula (3).

Synthesis Method of Polymer (A)

The polymer (A) may be obtained by a well-known synthesis method of poly(thio)ether. The synthesis is achieved through, for example, a reaction among: a dihalide monomer for providing the first structural unit; a diol monomer or a dithiol monomer for providing the second structural unit; and other compound(s), in an organic solvent under predetermined conditions.

The other compound(s) may be exemplified by an alkali metal compound, a chain-end terminator, and a monomer for providing any of the other structural units mentioned above.

The alkali metal compound reacts with the diol monomer and the like to form an alkali metal salt in the processes of the synthesis of the polymer (A). Examples of the alkali metal compound include:

alkali metal hydrides such as lithium hydride, sodium hydride and potassium hydride;

alkali metal hydroxides such as lithium hydroxide, sodium hydroxide and potassium hydroxide;

alkali metal carbonates such as lithium carbonate, sodium carbonate and potassium carbonate; and alkali metal hydrogencarbonates such as lithium hydrogencarbonate, sodium hydrogencarbonate and potassium hydrogencarbonate.

Of these, alkali metal hydroxides and alkali metal carbonates are preferred, and sodium hydroxide and potassium carbonate are more preferred.

In a case where the alkali metal compound is used, the lower limit of the amount of the alkali metal compound used is, in terms of the amount of metal atoms contained in the alkali metal compound with respect to hydroxyl groups in the total monomers used in the synthesis of the polymer (A), preferably 1-fold equivalents, more preferably 1.1-fold equivalents, more preferably 1.2-fold equivalents, and particularly preferably 1.5-fold equivalents. On the other hand, the upper limit of the amount of the alkali metal compound used is preferably 3-fold equivalents, and more preferably 2-fold equivalents.

The organic solvent is exemplified by N,N-dimethylacetamide, N,N-dimethylformamide, N-methy-2-pyrrolidone, 1,3-dimethyl-2-imidazolidinone, γ-butyrolactone, sulfolane, dimethyl sulfoxide, diethyl sulfoxide, dimethyl sulfone, diethyl sulfone, diisopropyl sulfone, diphenyl sulfone, diphenyl ether, benzophenone, methylene chloride, benzene, toluene, xylene, dialkoxybenzene (number of carbon atoms in an alkoxy group: 1 to 4), trialkoxybenzene (number of carbon atoms in an alkoxy group: 1 to 4), and the like. These organic solvents may be used either alone of one type, or in combination of two or more types thereof.

In addition to the organic solvents exemplified above, a solvent that forms an azeotropic mixture with water such as hexane, cyclohexane, octane, chlorobenzene, dioxane, tetrahydrofuran, anisole and phenetole may be further used.

The lower limit of the reaction temperature in the synthesis of the polymer (A) is preferably 20° C., and more preferably 100° C. The upper limit of the reaction temperature is preferably 250° C., and more preferably 180° C. The lower limit of the reaction time period is preferably 15 min, and more preferably 1 hr. The upper limit of the reaction time period is preferably 100 hrs, and more preferably 10 hrs.

Weight Average Molecular Weight (Mw) of Polymer (A)

The lower limit of the weight average molecular weight (Mw) of the polymer (A) is preferably 500, more preferably 1,000, still more preferably 10,000, particularly preferably 20,000, and further particularly preferably 30,000. The upper limit of the Mw is preferably 300,000, more preferably 200,000, still more preferably 100,000, and particularly preferably 80,000. When the Mw is no less than the lower limit, a further improvement of the heat resistance is enabled. On the other hand, when the Mw is greater than the upper limit, the formability may be impaired. It is to be noted that the Mw is determined by gel permeation chromatography (GPC) under the following conditions.

Column: "TSKgel α-M" coupled to "TSKgel Guard Column α" (each available from Tosoh Corporation), etc.

Developing solvent: N-methyl-2-pyrrolidone

Column temperature: 40° C.

Flow rate: 1.0 mL/min

Concentration of sample: 0.75% by mass

Amount of injected sample: 50 μL

Detector: differential refractometer

Standard substance: monodisperse polystyrene

Glass Transition Temperature (Tg) of Polymer (A)

The lower limit of the glass transition temperature of the polymer (A) is preferably 150° C., more preferably 165° C., still more preferably 180° C., and particularly preferably 190° C. When the glass transition temperature is no less than the lower limit, a further improvement of the heat resistance is enabled. The upper limit of the glass transition temperature is, for example, 300° C. It is to be noted that the term "glass transition temperature" as referred to herein means a value determined by using, for example, a differential scanning calorimeter in a nitrogen atmosphere at a rate of temperature rise of 20° C./min.

Resin Composition

The resin composition contains the polymer (A) and an organic solvent, and may also contain other components within a range not leading to impairment of the effects of the present invention. The resin composition contains the polymer (A) having superior solubility in the various types of organic solvents, and may thus be used as a highly versatile resin composition which finds various uses. Since the resin composition contains the polymer (A) having superior heat resistance, the heat deterioration of the resin molded product formed from the resin composition can be inhibited.

Examples of the organic solvent include organic solvents similar to those used in the synthesis of the polymer (A). In addition, since the resin composition contains the polymer (A) having superior solubility in various types of organic solvents, polyhydric alcohol ethers such as diethylene glycol ethyl methyl ether; polyhydric alcohol partially etherated carboxylates such as propylene glycol-1-monomethyl ether-2-acetate; carboxylic acid esters such as methyl 3-methoxypropionate and butyl acetate; lactones such as γ-butyrolactone; and the like may also be used as the organic solvent. These organic solvents may be used either alone of one type, or in combination of two or more types thereof.

The lower limit of the content of the polymer (A) in the resin composition with respect to the total solid content of the resin composition is preferably 1% by mass, more preferably 10% by mass, still more preferably 50% by mass, and particularly preferably 90% by mass. The upper limit of the content is, for example, 100% by mass.

The lower limit of the content of the organic solvent in the resin composition with respect to 100 parts by mass of the polymer (A) is preferably 50 parts by mass, more preferably 100 parts by mass, still more preferably 500 parts by mass, particularly preferably 1,000 parts by mass, further particularly preferably 5,000 parts by mass, and most preferably 10,000 parts by mass. The upper limit of the content is, for example, 100,000 parts by mass.

The other component is exemplified by an antioxidant, a lubricant, a fire retardant, an antimicrobial, a colorant, a release agent, a foaming agent, and a polymer other than the polymer (A). The other component may be used either alone of one type, or in combination of two or more types thereof.

Exemplary antioxidant includes a hindered phenol compound, a phosphorus compound, a sulfur compound, a metal compound, a hindered amine compound, and the like. Of these, a hindered phenol compound is preferred.

It is preferred that the hindered phenol compound has a molecular weight of no less than 500. Examples of the hindered phenol compound having a molecular weight of no less than 500 include triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2-4-bis-(n-octylthio)-6-(4-hydroxy-3,5-di-t-butylanilino)-3,5-triazine, pentaerythritol tetrakis[3-(3,5-t-butyl-4-hydroxyphenyl)propionate], 1,1,3-tris[2-methyl-4-[3-(3,5-di-t-butyl-4-hydroxyphenyl)propionyloxy]-5-t-butylphenyl]butane, 2,2-thio-diethylenebis[3-(3,5-di-t-butyl-4-hydroxyphenyl) propionate], octadecyl-3-(3,5-di-t-butyl-4-hydroxyphenyl) propionate, N,N-hexamethylenebis(3,5-di-t-butyl-4-hydroxy-hydrocinnamamide), 1,3,5-trimethyl-2,4,6-tris(3,5-di-t-butyl-4-hydroxybenzyl)benzene, tris-(3,5-di-t-butyl-4-hydroxybenzyl)-isocyanurate, 3,9-bis[2-[3-(3-t-butyl-4-hydroxy-5-methylphenyl)propionyloxy]-1,1, dimethylethyl]-2,3,8,10-tetraoxaspiro[5.5]undecane, and the like.

In a case where the resin composition contains an antioxidant, the lower limit of the content of the antioxidant contained in the resin composition with respect to 100 parts by mass of the polymer (A) is preferably 0.01 parts by mass, and more preferably 0.1 parts by mass. The upper limit of the content is preferably 10 parts by mass, and more preferably 1 part by mass.

The resin composition may be prepared by uniformly mixing the polymer (A), the organic solvent, and as needed, other components such as an antioxidant. The resin composition thus prepared may be in the form of a liquid, a paste, and the like.

Resin Molded Product

The resin molded product contains the polymer (A), and may be formed from the resin composition. Due to containing the polymer (A) having superior heat resistance, the inhibition of the heat deterioration of the resin molded product is enabled.

The resin molded product is exemplified by an optical component, and an insulating film for use in printed wiring boards.

Examples of the optical component include:

optical films such as a retardation sheet and a phase difference sheet;

various types of special-purpose lenses such as a conical lens, a spherical lens, and a cylindrical lens;

lens arrays; and the like.

The resin molded product may be produced by, for example, a metal molding process, an extrusion molding process, a solvent casting process, or the like. The metal molding process is suited for the production of lenses. The extrusion molding process and the solvent casting process are suited, and the extrusion molding is more preferred, for the production of optical films and insulating films for use in printed wiring boards.

The lower limit of the average thickness of the optical film is preferably 10 µm. The upper limit of the average thickness is preferably 1,000 µm, and more preferably 500 µm. When the average thickness is less than the lower limit, sufficient film strength may not be ensured. On the other hand, when the average thickness is greater than the upper limit, the transparency of the film may not be ensured.

The lower limit of the average thickness of the insulating film for printed wiring boards is preferably 10 µm. The upper limit of the average thickness is preferably 2 mm, more preferably 1 mm, and still more preferably 0.5 mm. When the average thickness is less than the lower limit, sufficient film strength may not be ensured. On the other hand, when the average thickness is greater than the upper limit, it may be difficult to apply the film to electronic devices which are desired to be thinner.

EXAMPLES

Hereinafter, the embodiments of the present invention will be described in detail by way of Examples, but the present invention is not in any way limited to the Examples.

$^1$H-NMR Analysis

The $^1$H-NMR analysis of the polymer was conducted in a deuterochloroform solvent by using a nuclear magnetic resonance spectrometer ("ECX400P" available from JEOL, Ltd.).

Synthesis of Polymer

Example 1

Into a four-neck separable flask equipped with a stirrer, 1-1-bis(4-hydroxyphenyl)-3,3,5-trimethylcyclohexane (18.6 g, 60.0 mmol), 4,6-dichloropyrimidine (8.9 g, 60.0 mmol), and potassium carbonate (11.1 g, 81.0 mmol) were weighed. Thereafter, N-methyl-2-pyrrolidone (64 g) was added thereto, and a reaction was allowed in a nitrogen atmosphere at 130° C. for 6 hrs. After the completion of the reaction, the mixture was diluted with N-methyl-2-pyrrolidone (368 g), the salt was removed therefrom by filtration, and then the resulting solution was charged into methanol (9.1 kg). The precipitated solid was filtered off, washed with a small amount of methanol, collected by filtration, and then dried by using a vacuum drier under a reduced pressure at 120° C. for 12 hrs, whereby a polymer of Example 1 represented by the following formula (10) was obtained (amount of polymer obtained: 20.5 g, yield: 90%). A $^1$H-NMR spectrum of the polymer thus obtained is shown in FIGURE.

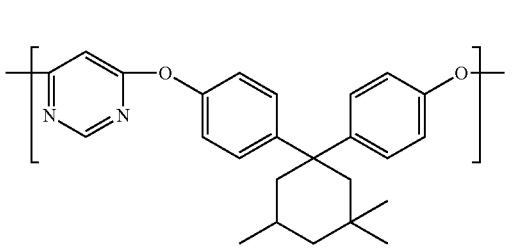

(10)

Example 2

Into a four-neck separable flask equipped with a stirrer, 1-1-bis(4-hydroxyphenyl)-3,3,5-trimethylcyclohexane (9.3 g, 30.0 mmol), 4-t-butylcatechol (5.0 g, 30.0 mmol), 4,6-dichloropyrimidine (8.9 g, 60.0 mmol), and potassium carbonate (11.2 g, 81.0 mmol) were weighed. Thereafter, N-methyl-2-pyrrolidone (109 g) and toluene (46 g) were added thereto and a mixture thus obtained was stirred. After refluxing toluene in a nitrogen atmosphere at 100° C. for 2 hrs, the toluene was removed by distillation, and then a reaction was further allowed at 130° C. for 6 hrs. After the completion of the reaction, the mixture was diluted with N-methyl-2-pyrrolidone (249 g), the salt was removed therefrom by filtration, and then the resulting solution was charged into methanol (7.5 kg). The precipitated solid was filtered off, washed with a small amount of methanol, collected by filtration, and then dried by using a vacuum drier under a reduced pressure at 120° C. for 12 hrs, whereby a polymer of Example 2 represented by the following formula (11) was obtained (amount of polymer obtained: 8.8 g, yield: 46.7%).

Example 3

Into a four-neck separable flask equipped with a stirrer, 2-t-butylhydroquinone (5.8 g, 35.0 mmol), 2,5-di-t-butylhydroquinone (7.8 g, 35.0 mmol), 2,2-bis(4-hydroxyphenyl)propane (6.8 g, 30.0 mmol), 4,6-dichloropyrimidine (14.9 g, 100.0 mmol), and potassium carbonate (18.7 g, 135.0 mmol) were weighted. Thereafter, N-methyl-2-pyrrolidone (102.9 g) was added thereto, and a reaction was allowed in a nitrogen atmosphere at 130° C. for 6 hrs. After the completion of the reaction, the mixture was diluted with N-methyl-2-pyrrolidone (300 g), the salt was removed therefrom by filtration, and then the resulting solution was charged into methanol (6 kg). The precipitated solid was filtered off, washed with a small amount of methanol, collected by filtration, and then dried by using a vacuum drier under a reduced pressure at 120° C. for 12 hrs, whereby a polymer of Example 3 represented by the following formula (12) was obtained (amount of polymer obtained: 23.4 g, yield: 83.5%).

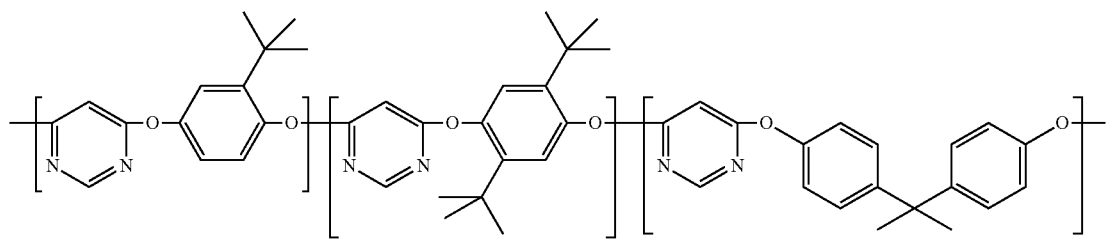

(12)

Example 4

Into a four-neck separable flask equipped with a stirrer, 1,1-bis(4-hydroxy-3-methylphenyl)-3,3,5-trimethylcyclohexane (20.3 g, 60.0 mmol), 2,5-di-t-butylhydroquinone (8.9 g, 40.0 mmol), 4,6-dichloropyrimidine (14.9 g, 100.0 mmol), and potassium carbonate (18.7 g, 135.0 mmol) were weighed. Thereafter, N-methyl-2-pyrrolidone (102.9 g) was added thereto, and a reaction was allowed in a nitrogen atmosphere at 130° C. for 6 hrs. After the completion of the reaction, the mixture was diluted with N-methyl-2-pyrrolidone (206 g), the salt was removed therefrom by filtration, and then the resulting solution was charged into methanol (7 kg). The precipitated solid was filtered off, washed with a small amount of methanol, collected by filtration, and then dried by using a vacuum drier under a reduced pressure at 120° C. for 12 hrs, whereby a polymer of Example 4 represented by the following formula (13) was obtained (amount of polymer obtained: 30.3 g, yield: 82%).

(11)

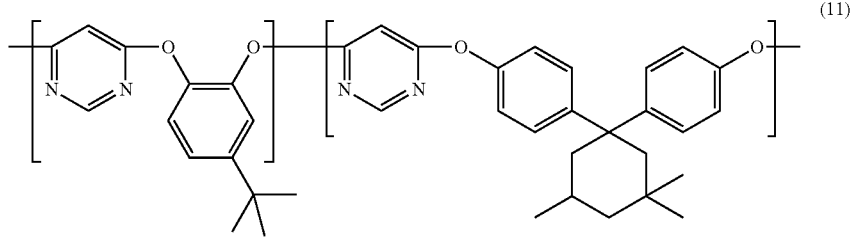

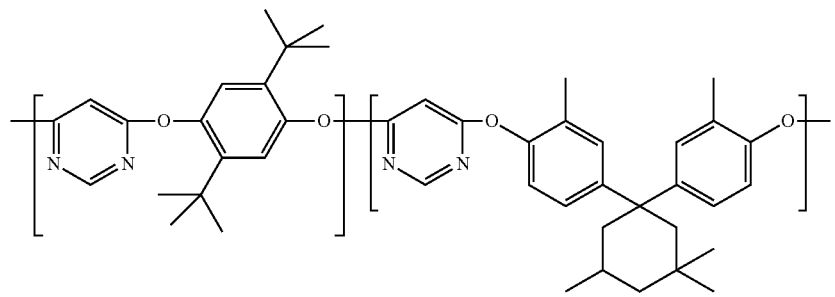

(13)

Example 5

Into a four-neck separable flask equipped with a stirrer, 1,1-bis(4-hydroxy-3-methylphenyl)-3,3,5-trimethylcyclohexane (25.4 g, 75.0 mmol), 4,6-dichloropyrimidine (11.2 g, 75.0 mmol), and potassium carbonate (14.0 g, 101.3 mmol) were weighed. Thereafter, N-methyl-2-pyrrolidone (85 g) was added thereto, and a reaction was allowed in a nitrogen atmosphere at 130° C. for 6 hrs. After the completion of the reaction, the mixture was diluted with N-methyl-2-pyrrolidone (300 g), the salt was removed therefrom by filtration, and then the resulting solution was charged into methanol (6 kg). The precipitated solid was filtered off, washed with a small amount of methanol, collected by filtration, and then dried by using a vacuum drier under a reduced pressure at 120° C. for 12 hrs, whereby a polymer of Example 5 represented by the following formula (14) was obtained (amount of polymer obtained: 29.6 g, yield: 95%).

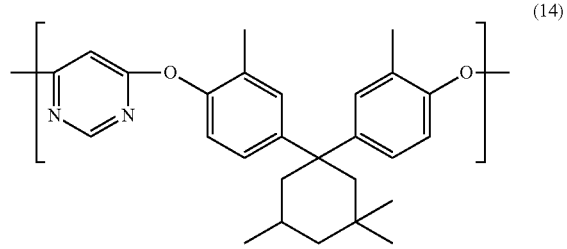

(14)

Example 6

Into a four-neck separable flask equipped with a stirrer, 1-1-bis(4-hydroxyphenyl)-3,3,5-trimethylcyclohexane (10.7 g, 34.5 mmol), 3,6-dichloropyridazine (5.1 g, 34.2 mmol), and potassium carbonate (6.5 g, 47.0 mmol) were weighed. Thereafter, N-methyl-2-pyrrolidone (36 g) was added thereto, and a reaction was allowed in a nitrogen atmosphere at 145° C. for 9 hrs. After the completion of the reaction, the mixture was diluted with N-methyl-2-pyrrolidone (150 g), the salt was removed therefrom by filtration, and then the resulting solution was charged into methanol (3 kg). The precipitated solid was filtered off, washed with a small amount of methanol, collected by filtration, and then dried by using a vacuum drier under a reduced pressure at 120° C. for 12 hrs, whereby a polymer of Example 6 represented by the following formula (15) was obtained (amount of polymer obtained: 7.6 g, yield: 48%).

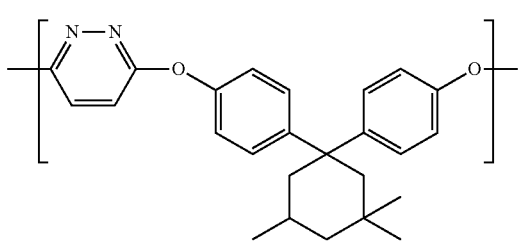

(15)

Example 7

Into a four-neck separable flask equipped with a stirrer, 1,1-bis(4-hydroxyphenyl)-3,3,5-trimethylcyclohexane (23.3 g, 75.1 mmol), 2,6-dichloropyrazine (11.2 g, 75.2 mmol), and potassium carbonate (14.0 g, 101.3 mmol) were weighed. Thereafter, N-methyl-2-pyrrolidone (80 g) was added thereto, and a reaction was allowed in a nitrogen atmosphere at 145° C. for 6 hrs. After the completion of the reaction, the mixture was diluted with N-methyl-2-pyrrolidone (300 g), the salt was removed therefrom by filtration, and then the resulting solution was charged into methanol (6 kg). The precipitated solid was filtered off, washed with a small amount of methanol, collected by filtration, and then dried by using a vacuum drier under a reduced pressure at 100° C. for 12 hrs, whereby a polymer of Example 7 represented by the following formula (16) was obtained (amount of polymer obtained: 21.1 g, yield: 73%).

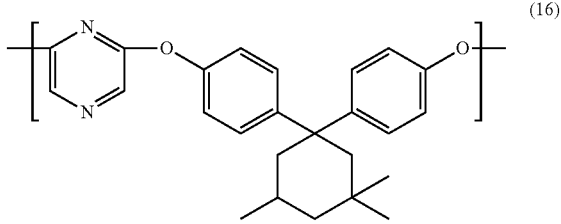

(16)

Example 8

Into a four-neck separable flask equipped with a stirrer, 1-1-bis(4-hydroxyphenyl)-3,3,5-trimethylcyclohexane (37.2 g, 120.0 mmol), 4,6-dichloropyrimidine (17.8 g, 120.0 mmol), and potassium carbonate (22.2 g, 162.0 mmol) were weighed. Thereafter, N-methyl-2-pyrrolidone (130 g) was added thereto, and a reaction was allowed in a nitrogen atmosphere at 130° C. for 10 hrs. After the completion of the reaction, the mixture was diluted with N-methyl-2-pyrrolidone (730 g), the salt was removed therefrom by filtration, and then the resulting solution was charged into methanol (18 kg). The precipitated solid was filtered off, washed with a small amount of methanol, collected by filtration, and then dried by using a vacuum drier under a reduced pressure at 120° C. for 12 hrs, whereby a polymer of Example 8 was obtained (amount of polymer obtained: 21.6 g, yield: 95%, represented by the same structural formula as the above formula (10)).

Comparative Example 1

Into a four-neck separable flask equipped with a stirrer, 9,9-bis(4-hydroxy-3-methylphenyl)fluorene (18.9 g, 50.0 mmol), 4,6-dichloropyrimidine (7.4 g, 50.0 mmol), and potassium carbonate (9.3 g, 67.5 mmol) were weighed. Thereafter, N-methyl-2-pyrrolidone (103 g) was added thereto, and a reaction was allowed in a nitrogen atmosphere at 130° C. for 6 hrs. After the completion of the reaction, the mixture was diluted with N-methyl-2-pyrrolidone (329 g), the salt was removed therefrom by filtration, and then the resulting solution was charged into methanol (9.1 kg). The precipitated solid was filtered off, washed with a small amount of methanol, collected by filtration, and then dried by using a vacuum drier under a reduced pressure at 120° C. for 12 hrs, whereby a polymer of Comparative Example 1 represented by the following formula (20) was obtained (amount of polymer obtained: 11.5 g, yield: 61.8%).

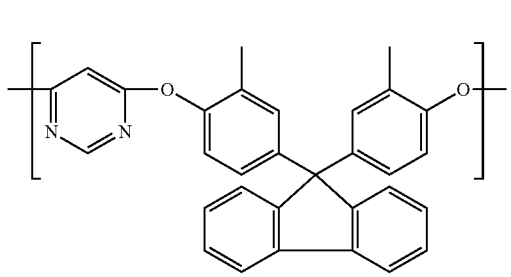

(20)

Comparative Example 2

Into a four-neck separable flask equipped with a stirrer, 1,3-dihydroxybenzene (11.0 g, 100.0 mmol), 4,6-dichloropyrimidine (14.9 g, 100.0 mmol), and potassium carbonate (18.6 g, 135.0 mmol) were weighed. Thereafter, N-methyl-2-pyrrolidone (128 g) was added thereto, and a reaction was allowed in a nitrogen atmosphere at 130° C. for 6 hrs. After the completion of the reaction, the mixture was diluted with N-methyl-2-pyrrolidone (225 g), the salt was removed therefrom by filtration, and then the resulting solution was charged into methanol (7.4 kg). The precipitated solid was filtered off, washed with a small amount of methanol, collected by filtration, and then dried by using a vacuum drier under a reduced pressure at 120° C. for 12 hrs, whereby a polymer of Comparative Example 2 represented by the following formula (21) was obtained (amount of polymer obtained: 11.5 g, yield: 62%).

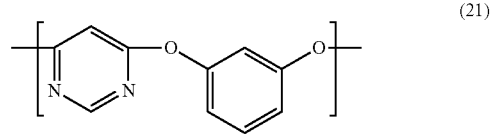

(21)

Comparative Example 3

Into a four-neck separable flask equipped with a stirrer, 2,2-bis(4-hydroxyphenyl)propane (11.4 g, 50.0 mmol), 4,6-dichloropyrimidine (7.4 g, 50.0 mmol), and potassium carbonate (9.3 g, 67.5 mmol) were weighed. Thereafter, N-methyl-2-pyrrolidone (90 g) was added thereto, and a reaction was allowed in a nitrogen atmosphere at 130° C. for 6 hrs. After the completion of the reaction, the mixture was diluted with N-methyl-2-pyrrolidone (200 g), the salt was removed therefrom by filtration, and then the resulting solution was charged into methanol (6.1 kg). The precipitated solid was filtered off, washed with a small amount of methanol, collected by filtration, and then dried by using a vacuum drier under a reduced pressure at 120° C. for 12 hrs, whereby a polymer of Comparative Example 3 represented by the following formula (22) was obtained (amount of polymer obtained: 12.1 g, yield: 80%).

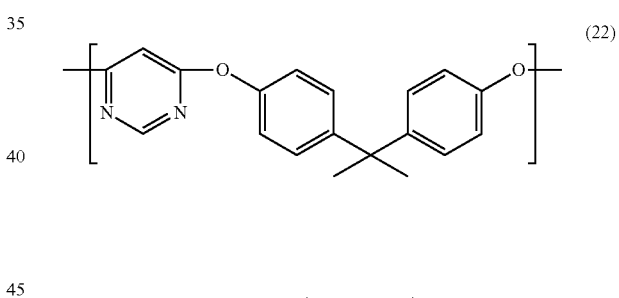

(22)

Comparative Example 4

Into a four-neck separable flask equipped with a stirrer, 1-1-bis(4-hydroxyphenyl)-3,3,5-trimethylcyclohexane (15.5 g, 50.0 mmol), 4,4'-dichlorodiphenyl sulfone (14.4 g, 50.0 mmol), and potassium carbonate (9.3 g, 67.5 mmol) were weighed. Thereafter, N-methyl-2-pyrrolidone (121 g) and toluene (50 g) were added thereto and a mixture thus obtained was stirred. After refluxing toluene in a nitrogen atmosphere at 100° C. for 2 hrs, the toluene was removed by distillation, and then a reaction was allowed at 190° C. for 6 hrs. After the completion of the reaction, the mixture was diluted with N-methyl-2-pyrrolidone (398 g), the salt was removed therefrom by filtration, and then the resulting solution was charged into methanol (10.5 kg). The precipitated solid was filtered off, washed with a small amount of methanol, collected by filtration, and then dried by using a vacuum drier under a reduced pressure at 120° C. for 12 hrs, whereby a polymer of Comparative Example 4 represented by the following formula (23) was obtained (amount of polymer obtained: 23.3 g, yield: 88.8%).

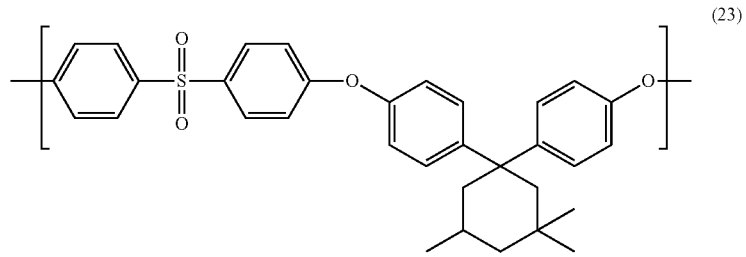

(23)

Evaluations

According to the following methods, the weight average molecular weight (Mw), the glass transition temperature (Tg), the 1% mass reduction temperature (Td1), the solubility in various types of organic solvents, the relative permittivity (εr) and the dielectric loss tangent (tan δ) of the polymers thus obtained were evaluated. The results of the evaluations are shown in Table 1. It is to be noted that "-" in Table 1 means that no evaluation was made in regard to the evaluation item concerned.

Weight Average Molecular Weight (Mw)

The weight average molecular weight (Mw) of each polymer was determined by using a GPC apparatus ("HLC-8320 GPC" available from Tosoh Corporation) under the following conditions.

Column: "TSKgel α-M" coupled to "TSKgel Guard Column α" (each available from Tosoh Corporation)
Developing solvent: N-methyl-2-pyrrolidone
Column temperature: 40° C.
Flow rate: 1.0 mL/min
Concentration of sample: 0.75% by mass
Amount of injected sample: 50 μL
Detector: differential refractometer
Standard substance: monodisperse polystyrene Glass Transition Temperature (Tg)

The temperature corresponding to a point of intersection of a baseline and a tangent line through an inflection point which were drawn with respect to a DSC temperature rise curve in the thermogram obtained by a differential scanning calorimeter ("Thermo Plus DSC8230" available from Rigaku Corporation) in a nitrogen atmosphere at a temperature rise rate of 20° C./min was defined as the glass transition temperature (Tg) of each polymer. The temperature corresponding to a peak in a DDSC curve, which is a curve obtained by differentiating the DSC temperature rise curve, was defined as the inflection point. The DSC baseline was determined with appropriate references to the DDSC curve.

1% Mass Reduction Temperature (Td1)

The temperature at which the mass of the polymer was reduced by 1% by mass in total on the basis of a thermal mass curve obtained in a nitrogen atmosphere at a temperature rise rate of 10° C./min by using a differential-type differential thermal balance ("TG/DTA6200" available from SII NanoTechnology Inc.) was defined as the 1% mass reduction temperature (Td1) of each polymer. It is to be noted that Td1 is one of the indices of heat resistance, and the polymer having a greater value of Td1 is evaluated to have superior heat resistance.

Solubility in Various Types of Organic Solvents

The solubility of each polymer in various types of solvents was determined by adding each polymer to various types of organic solvents shown in Table 1 to obtain solutions each containing the polymer at a 10% mass concentration and by stirring the resulting solutions, and was evaluated as being: "A" in a case where no precipitates were visually observed; and "B" in a case where precipitates were visually observed.

The organic solvents used to evaluate the solubility are listed below.

EDM: diethylene glycol ethyl methyl ether
MMP: methyl 3-methoxypropionate
BuOAc: butyl acetate
PGMEA: propylene glycol-1-monomethyl ether-2-acetate
GBL: γ-butyrolactone Relative Permittivity (εr) and Dielectric Loss Tangent (Tan δ)

First, an appropriate amount of each polymer was dissolved in methylene chloride to prepare a polymer solution, and the resulting solution was formed into a film on a glass plate and dried overnight under a normal pressure at room temperature. Then, remaining methylene chloride was removed by using a vacuum drier to obtain a film having a size of 3×4 cm and an average thickness of 90 μm. Aluminum was deposited in a vacuum onto one face of the film by using a vacuum evaporator ("JEE-420" available from JEOL, Ltd.) to form an electrode, whereby a test piece for evaluating εr and tan δ was obtained. In regard to the test piece, εr and tan δ were measured by using a precision LCR meter ("4284A precision LCR meter" available from Hewlett Packard Inc.) in accordance with JIS-C-2138 (2007), with an amplitude of 100 mV, at a frequency of 1 MHz, at a temperature of 25° C., and at a relative humidity of 50%.

TABLE 1

| | Structure of polymer | Mw | Tg (° C.) | Td1 (° C.) | Solubility in each organic solvent | | | | | εr | tan δ |
|---|---|---|---|---|---|---|---|---|---|---|---|
| | | | | | EDM | MMP | BuOAc | PGMEA | GBL | | |
| Example 1 | (10) | 32,000 | 206 | 417 | A | A | B | B | A | 2.92 | 0.0083 |
| Example 2 | (11) | 48,000 | 183 | 383 | A | A | A | A | A | 2.88 | 0.0037 |
| Example 3 | (12) | 70,000 | 171 | 430 | A | A | A | A | A | 2.89 | 0.0047 |
| Example 4 | (13) | 80,000 | 196 | 412 | B | B | B | B | B | 2.55 | 0.0020 |
| Example 5 | (14) | 63,000 | 197 | 411 | A | A | A | A | B | 2.75 | 0.0026 |

TABLE 1-continued

|  | Structure of polymer | Mw | Tg (°C.) | Td1 (°C.) | EDM | MMP | BuOAc | PGMEA | GBL | εr | tanδ |
|---|---|---|---|---|---|---|---|---|---|---|---|
| Example 6 | (15) | 51,800 | 231 | 373 | A | B | B | B | B | 3.65 | 0.0412 |
| Example 7 | (16) | 11,000 | 167 | 377 | A | A | A | A | A | — | — |
| Example 8 | (10) | 180,000 | — | — | — | — | — | — | — | — | — |
| Comparative Example 1 | (20) | 20,000 | 240 | 383 | B | B | B | B | A | — | — |
| Comparative Example 2 | (21) | 7,000 | — | — | B | B | B | B | B | — | — |
| Comparative Example 3 | (22) | 36,000 | 153 | 430 | B | B | B | B | A | 3.10 | 0.0092 |
| Comparative Example 4 | (23) | 43,000 | 233 | 453 | A | B | B | B | B | 3.08 | 0.0430 |

As is clear from Table 1, the polymers of Examples exhibited superior heat resistance and increased solubility in various types of organic solvents. In particular, the polymers of Examples 1 to 3, 5, and 7 each had a greater value of Td1, which was no less than 370° C., and each of the polymers was soluble in three or more different types of the organic solvents (rated A). On the other hand, each of the polymers of Comparative Examples 1, 3, and 4 was soluble in only one type of the organic solvent, and the polymer of Comparative Example 2 was soluble in none of the above organic solvents (rated B).

Moreover, as shown in Table 1, εr and tan δ of each of the polymers of Examples 1 to 5 were smaller than εr and tan δ of each of the polymers of Comparative Examples 3 and 4, and it was thus revealed that the high frequency wave properties of the printed wiring board containing any of the polymers of Examples 1 to 5 can be improved.

The present invention is capable of providing a polymer having superior heat resistance and increased solubility in various types of organic solvents, and providing a resin composition and a resin molded product containing the polymer.

Obviously, numerous modifications and variations of the present invention are possible in light of the above teachings. It is therefore to be understood that within the scope of the appended claims, the invention may be practiced otherwise than as specifically described herein.

What is claimed is:

1. A polymer comprising:
    a first structural unit represented by formula (1-1), (1-2) or (1-3); and
    a second structural unit represented by formula (2) or (3),

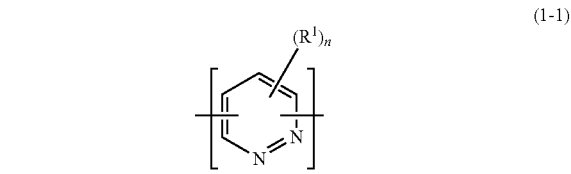

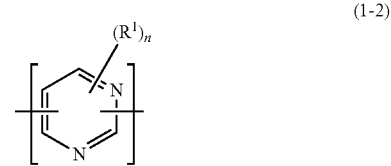

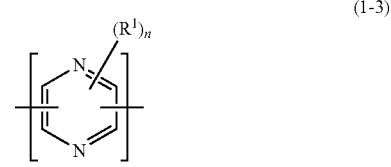

wherein in the formulae (1-1) to (1-3), $R^1$ each independently represents a halogen atom, a monovalent hydrocarbon group having 1 to 20 carbon atoms, a monovalent halogenated hydrocarbon group having 1 to 20 carbon atoms, a nitro group or a cyano group; and n is each independently an integer of 0 to 2, wherein, in a case where n is 2, a plurality of $R^1$s are identical or different, wherein the plurality of $R^1$s optionally taken together represent a ring structure through binding,

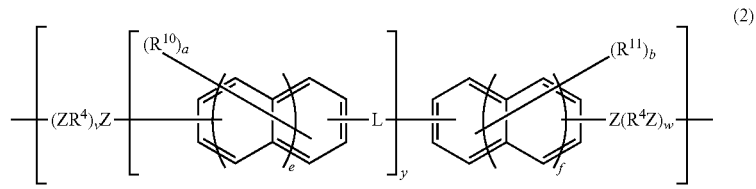

wherein in the formula (2), $R^{10}$ and $R^{11}$ each independently represent a halogen atom, a monovalent hydrocarbon group having 1 to 20 carbon atoms, a monovalent halogenated hydrocarbon group having 1 to 20 carbon atoms, a nitro group or a cyano group; e and f are each independently an integer of 0 to 2; a and b are each independently an integer of 0 to 8, wherein, in a case where a is no less than 2, a plurality of $R^{10}$s are identical or different, wherein the plurality of $R^{10}$s optionally taken together represent a ring structure through binding, and in a case where b is no less than 2, a plurality of $R^{11}$s are identical or different, wherein the plurality of $R^{11}$s optionally taken together represent a ring structure through binding; Zs each independently represent —O— or —S—; $R^4$s each independently represent a methylene group or an alkylene group having 2 to 4 carbon atoms; v is an integer of 0 to 2, wherein, in a case where v is 2, two $R^4$s are identical or different, and two Zs are identical or different; w is an integer of 0 to 2, wherein, in a case where w is 2, two $R^4$s are identical or different, and two Zs are identical or different; L represents a divalent group represented by formula (2-1); and y is an integer of 1 to 3, wherein, in a case where y is no less than 2, a plurality of Ls are identical or different, and in a case where y is no less than 2 and a is no less than 1, a plurality of $R^{10}$s are identical or different,

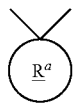

(2-1)

wherein in the formula (2-1), $R^a$ represents a divalent alicyclic hydrocarbon group having 5 to 30 ring atoms or a divalent fluorinated alicyclic hydrocarbon group having 5 to 30 ring atoms, and

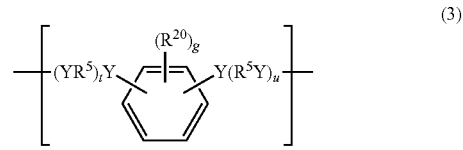

(3)

wherein in the formula (3), $R^{20}$ represents a monovalent hydrocarbon group having 1 to 20 carbon atoms or a monovalent halogenated hydrocarbon group having 1 to 20 carbon atoms; g is an integer of 1 to 4, wherein, in a case where g is no less than 2, a plurality of $R^{20}$s are identical or different, wherein the plurality of $R^{20}$s optionally taken together represent a ring structure through binding; Ys each independently represent —O— or —S—; $R^5$s each independently represent a methylene group or an alkylene group having 2 to 4 carbon atoms; t is an integer of 0 to 2, wherein, in a case where t is 2, two $R^5$s are identical or different, and two Ys are identical or different; and u is an integer of 0 to 2, wherein, in a case where u is 2, two $R^5$s are identical or different, and two Ys are identical or different.

2. The polymer according to claim 1, wherein in the formula (2-1), $R^a$ represents a monocyclic alicyclic hydrocarbon group having 5 to 15 ring atoms or a monocyclic fluorinated alicyclic hydrocarbon group having 5 to 15 ring atoms.

3. The polymer according to claim 2, wherein in the formula (2-1), $R^a$ represents a monocyclic alicyclic hydrocarbon group having 5 to 10 ring atoms or a monocyclic fluorinated alicyclic hydrocarbon group having 5 to 10 ring atoms.

4. The polymer according to claim 1, wherein in the formula (2-1), $R^a$ represents a polycyclic alicyclic hydrocarbon group having 7 to 30 ring atoms or a polycyclic fluorinated alicyclic hydrocarbon group having 7 to 30 ring atoms.

5. The polymer according to claim 1, wherein the polymer has a polystyrene equivalent weight average molecular weight of no less than 500 and no greater than 300,000.

6. A resin composition comprising the polymer according to claim 1 and an organic solvent.

7. A resin molded product comprising the polymer according to claim 1.

* * * * *